US007568040B2

(12) United States Patent
Townsley et al.

(10) Patent No.: US 7,568,040 B2
(45) Date of Patent: Jul. 28, 2009

(54) TECHNIQUES FOR ESTABLISHING SUBSCRIBER SESSIONS ON AN ACCESS NETWORK USING DHCP

(75) Inventors: William Mark Townsley, Nashville, TN (US); Richard Pruss, Tewantin (AU); Ralph Droms, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 527 days.

(21) Appl. No.: 11/362,703

(22) Filed: Feb. 25, 2006

(65) Prior Publication Data

US 2007/0203990 A1    Aug. 30, 2007

Related U.S. Application Data (63) Continuation-in-part of application No. 11/362,296, filed on Feb. 24, 2006.

(51) Int. Cl.
G06F 15/16 (2006.01)
G06F 15/173 (2006.01)

(52) U.S. Cl. .................. 709/230; 709/226; 709/237
(58) Field of Classification Search .............. 709/206, 709/237, 230
See application file for complete search history.

(56) References Cited

U.S. PATENT DOCUMENTS

| 6,286,039 | B1 * | 9/2001 | Van Horne et al. ........... 709/221 |
| 7,342,906 | B1 * | 3/2008 | Calhoun ...................... 370/338 |
| 2002/0006133 | A1 | 1/2002 | Kakemizu et al. |
| 2002/0013844 | A1 | 1/2002 | Garrett et al. |
| 2002/0098840 | A1 * | 7/2002 | Hanson et al. .............. 455/435 |
| 2003/0101243 | A1 * | 5/2003 | Donahue et al. ............ 709/220 |
| 2005/0105529 | A1 | 5/2005 | Arberg et al. |
| 2005/0286518 | A1 * | 12/2005 | Park et al. .................... 370/389 |

FOREIGN PATENT DOCUMENTS

| KR | 1020020077049 | 12/2002 |
| WO | WO2005104500 | 11/2005 |

OTHER PUBLICATIONS

Droms, "RFC 2132—DHCP Options and BOOTP Vendor Extensions", Mar. 1997, Internet: ietf.org, p. 1-32.*

(Continued)

Primary Examiner—Patrice Winder
Assistant Examiner—Taylor Elfervig
(74) Attorney, Agent, or Firm—Patent Capital Group (57) ABSTRACT

Techniques for supporting subscriber sessions for access to an IP network include receiving from a first node at a different second node, a Dynamic Host Configuration Protocol (DHCP) formatted echo-request message. The echo-request message includes a DHCP option field that holds data that indicates an echo-request type. In response to receiving the echo-request message, the second node sends to the first node a DHCP formatted echo-reply message that corresponds to the echo-request message. The echo-reply message includes a DHCP option field that holds data that indicates an echo-reply type. When received by the first node, the echo-response message causes the first node to determine a connected state with the second node. Point to Point Protocol (PPP) keep-alive messages between a customer premises node and a remote access server gateway to an IP network may be replaced by these DHCP echo-request and echo-reply messages.

47 Claims, 5 Drawing Sheets

OTHER PUBLICATIONS

Droms, "RFC 2131—Dynamic Host Configuration Protocol", Mar. 1997, Internet: ietf.org, p. 1-43.*

Simpson, W., PPP Challenge Handshake Authetnication Protocol (CHAP), www.ietf.org/rfc/rfc1994.txt, Aug. 1, 1996, p. 12, Publisher: Internet Engineering Task Force,, Published in: Internet.

Patrick, M., DHCP Relay Agent Information Option, www.ietf.org/rfc/rfc3046.txt, Jan. 1, 2001, p. 14, Publisher: Internet Engineering Task Force, Published in: Internet.

Droms, R., Authentication for DHCP Messages, www.ietf.org/rfc/rfc3118.txt, Jun. 1, 2001, p. 17, Publisher: Internet Engineering Task Force, Published in: Internet.

* cited by examiner

TECHNIQUES FOR ESTABLISHING SUBSCRIBER SESSIONS ON AN ACCESS NETWORK USING DHCP

CROSS-REFERENCE TO RELATED APPLICATIONS

This application claims benefit as a Continuation-in-part of U.S. patent application Ser. No. 11/362,296, filed Feb. 24, 2006 (referenced hereinafter as Townsley) the entire contents of which are hereby incorporated by reference as if fully set forth herein, under 35 U.S.C. §120.

BACKGROUND OF THE INVENTION

1. Field of the Invention

The present invention relates to migrating point to point protocol (PPP) functions for customer access of a wide area network to the Internet Protocol (IP).

2. Description of the Related Art

Networks of general purpose computer systems and special devices connected by external communication links are well known. The networks often include one or more network devices that facilitate the passage of information between the computer systems. A network node is a network device or computer system or special device connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The next protocol is said to be encapsulated in the particular protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information.

One such layer 2 protocol is the Point to Point Protocol (PPP) between a host computer on a local area network and a network node that provides access to a wide area network, such as the Internet. Some protocols, including PPP, pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications. For example, authentication information used to authenticate users and layer 3 address assignment information used by routers to direct data packets according to their layer 3 addresses are passed between nodes in PPP control messages in the PPP control plane.

PPP provides a standard method for transporting any of multiple protocol data packets (also called frames, datagrams and cells, and used interchangeably herein) over point-to-point links. PPP is defined in an Internet Engineering Task Force (IETF) request for comments document (RFC) numbered 1661, dated July 1994, the entire contents of which are hereby incorporated by reference as if fully set forth herein. Copies of RFC 1661 and other RFCs cited below are available at the World Wide Web domain ietf.org. PPP has been used extensively to connect users at a home site to a remote network using modems and telephone copper loop infrastructure. PPP provides a robust control plane for signaling line characteristics, network protocol parameters, and user-level authentication. In large service provider networks, the user authentication models are generally well entrenched, including, but not limited to, custom-built applications for communicating policy to network equipment and to track billing information.

For applications in which multiple hosts on a shared Ethernet establish PPP sessions to multiple destinations via one or more bridging modems, a PPP over Ethernet (PPPoE) specification has been developed. PPPoE is intended to be used with broadband remote access technologies that provide a bridged Ethernet topology, when access providers wish to distinguish different users connected via the same modem to the remote network. PPP provides this distinction by opening different sessions with different users. PPPoE is described in IETF RFC 2516, the entire contents of which are hereby incorporated by reference as if fully set forth herein. After establishing a PPP session, IP data packets are sent encapsulated in PPPoE.

There is a trend among network service providers to move to Ethernet and IP as the only layer two and layer three protocols between end nodes at a user site and end nodes on the remote network to which access is sought. One reason given for this trend is a desire to make use of IP-based quality of service (QoS) capabilities available in access network equipment. Another reason given is to reduce complexity because data packets can be transmitted from one portion of the network infrastructure to another without translating between layer 2 protocols. Another reason given is that using IP over Ethernet will improve the bandwidth utilization per transmitted frame due to a lower protocol overhead.

One approach is to eliminate PPP and PPPoE; and provide the PPP functions using IP-based functions. For example, it has been proposed to use International Electrical and Electronics Engineers standard 802.1x or web portal methods for authentication, and to use the Dynamic Host Configuration Protocol (DHCP) for assigning IP addresses. A justification offered for this approach is that, when all encapsulated data packets are IP, the multi-protocol encapsulation capability of PPP is not valuable.

There are some disadvantages to eliminating PPP. For example, web portal based authentication has drawbacks in that it requires a specific application (web browser) to be activated before anything can happen. The existing IP-based functions do not perform all the functions performed by PPP. Some of these protocols would have to be extended to perform the missing functions. For example, DHCP would have to be extended to perform user authentication and integration with an authorization server, and include a connection "keep-alive" mechanism, among other tasks, in order to encompass all of the functionality that PPP offers today.

In one approach, described in RFC 3118 on DHCP authentication, a mechanism is presented that is directed to authenticating the DHCP messages themselves to ensure that they did not get altered in transmit, rather than authenticating the user.

PPP provides a "keep-alive" mechanism for detecting when a session is active and available so that reallocation of an IP address or billing can take place on session termination. DHCP does not have any mechanism today apart from a lease timeout. In one approach, DHCP is used with very short lease times, e.g., as short as 5 seconds. A problem with this approach is that devices for users who engage in sessions that last longer than the lease time have to negotiate new leases with the DHCP server, increasing the consumption of network resources both in terms of traffic volume and computational time at a node that hosts a DHCP server.

An Address Resolution Protocol (ARP) has been developed and deployed to determine what nodes have what IP addresses. An ARP request is broadcast on a link, and every node on the link responds with its IP address. In one approach ARP is used to determine whether an IP address known to be on a given link is still active. A problem with this approach is that any recipient of the broadcast may respond. A mis-configured or rogue recipient may respond with the IP address of a disconnected node and thereby mask the actual loss of connection state.

Also, as pointed out above, especially in large service provider networks, PPP-based functions are generally well entrenched with provider-specific extensions. For example, some provider-specific extensions provide authorization to determine whether an authentic user is in good standing for receiving one or more services, e.g., for paid-up basic services, for voice services, or for a particular quality of service, or some combination. Many of these extensions involve a Broadband Remote Access Server (BRAS) hooking into an Authentication, Authorization, Accounting (AAA) server like the Remote Authentication Dial-In User Service (RADIUS) server. Neither RFC 3118 nor DHCP are directed to determining whether an authentic user is actually authorized to access any particular services on the network, nor involve hooking into an AAA server. A wholesale replacement of general PPP functions with IP will not address any provider-specific extensions. Some transition period is needed to give the provider time to adapt the provider-specific extensions to the IP mechanisms.

Based on the foregoing, there is a clear need for techniques that migrate one or more PPP functions to IP over Ethernet infrastructure but that do not suffer all the disadvantages of the prior art approaches. In particular there is a need to provide session keep-alive and session termination detection functions in DHCP to replace these functions in PPP.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus and system are described for migrating at least one of PPP session keep-alive functionality and PPP session termination functionality to DHCP. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In various embodiments described herein, techniques are provided that perform at least some PPP control plane functionality while utilizing DHCP, itself a purely control plane protocol. In the following description, embodiments are described primarily in the context of migrating the PPP session functionality to DHCP between a customer premises end node and a Broadband Remote Access Server (BRAS) across an access network. However, the invention is not limited to these embodiments. In other embodiments, the functionality is provided by DHCP formatted messages sent between any node and any other node across an IP network. In some embodiments, DHCP messages are used in Network Admission Control (NAC) for sessions with any host connected to an enterprise network.

DHCP is based on a client-server model of network communications, well known and widely used in the art. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, redundancy, or other advantages, or some combination.

According to the DHCP client server model, a DHCP client operating on a device communicates with one or more DHCP servers to obtain configuration information, including an IP address for the client's host device. The configuration data is valid for a limited time interval, called a lease time. Before the lease expires at the end of the lease time interval, the DHCP client may send a renew request message to extend the lease for some period of time, usually another or longer lease time.

1.0 Network Overview

Figure 1:
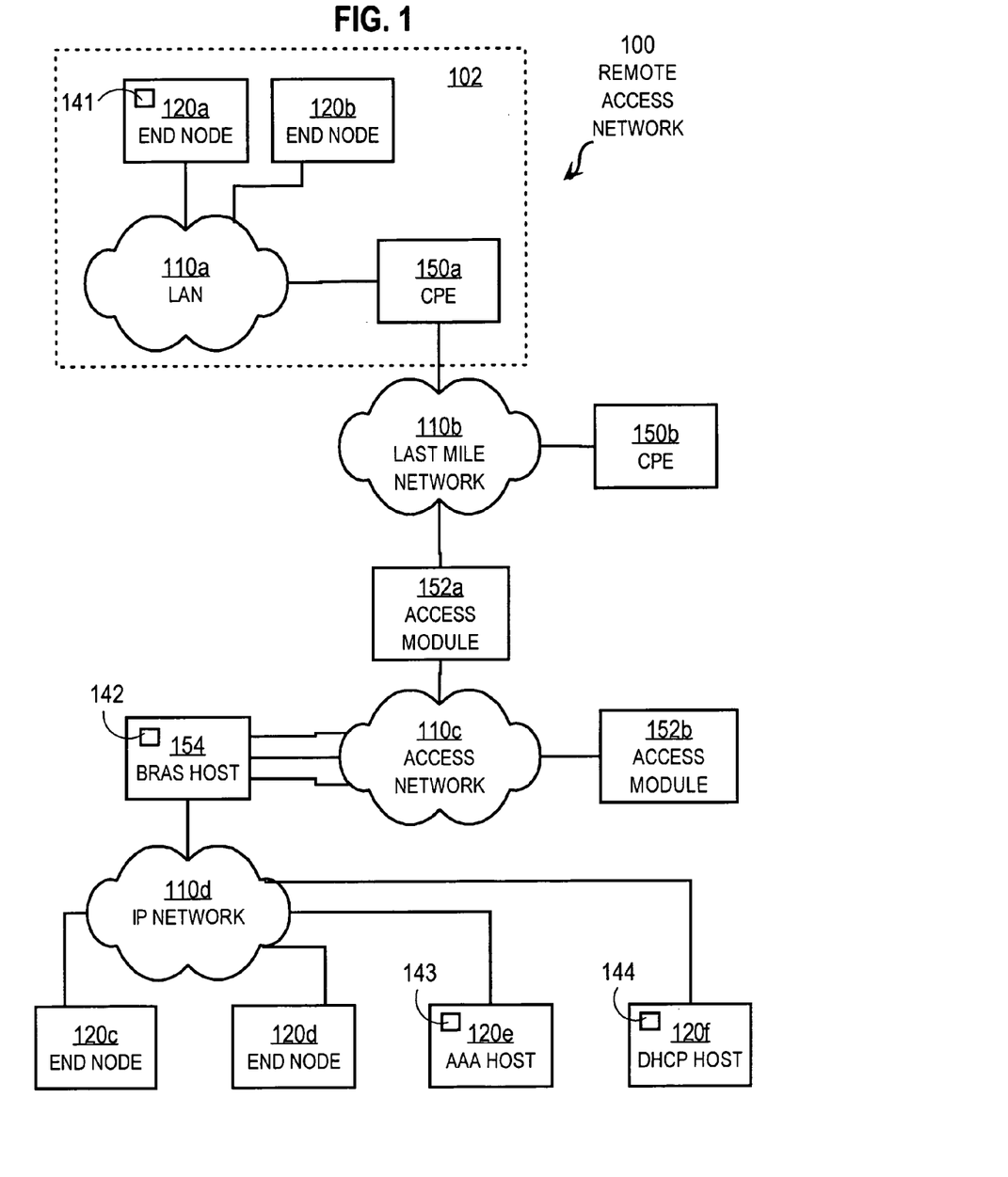
FIG. 1 is a block diagram that illustrates a remote access network, according to an embodiment.

FIG. 1 is a block diagram that illustrates a remote access network 100, according to an embodiment. A computer network is a geographically distributed collection of interconnected sub-networks (e.g., sub-networks 110a, 110b, 110c, 110d collectively referenced hereinafter as sub-networks 110) for transporting data between nodes, such as computers, video content sources and television set boxes. A local area network (LAN) 110a is an example of such a sub-network. The network's topology is defined by an arrangement of end nodes (e.g., end nodes 120a, 120b, 120c, 120d, 120e, 120f collectively referenced hereinafter as end nodes 120) that communicate with one another, typically through one or more intermediate network nodes, such as a router or switch, that facilitate routing data between end nodes 120 on different sub-networks. As used herein, an end node 120 is a node that is configured to originate or terminate communications over the network. End nodes 120 include an Authentication, Authorization, Accounting (AAA) server host 120e, and a DHCP server host 120f.

In contrast, an intermediate network node facilitates the passage of data between end nodes. Intermediate network nodes depicted in FIG. 1 include customer premises equipment (CPE) 150a, 150b, access modules 152a, 152b, and Broadband Remote Access Server (BRAS) node 154.

Four sub-networks 110 that are typically involved in remote access are depicted in FIG. 1. Each sub-network 110 may includes zero or more intermediate network nodes. An IP network 110d is the target for remote access by users at a remote site 102.

To access IP network 110d, a LAN 110a is connected to CPE 150a which serves as a bridge to a network 110b called the last mile network. The last mile network 110b is built on a telephone wire infrastructure, such as dial-up or digital subscriber line (DSL), or cable television infrastructure, either coaxial cable or optical fiber, or a wireless infrastructure, such as WiFi (IEEE standard 802.11). In an illustrated embodiment, LAN 110a uses Ethernet infrastructure. Although the remote site 102 includes an Ethernet LAN 110a and two end nodes 120a, 120b, in other embodiments more or fewer end nodes 120 are connected to more or fewer or different LANs 110, such as one or more LANs using Asynchronous Transfer Mode (ATM) infrastructure. In some cases, CPE is a telephone modem using acoustic signals over a low-bandwidth legacy telephone system. In an illustrated embodiment, CPE 150a is a digital subscriber line (DSL) modem for establishing a high bandwidth DSL connection over the telephone wire as last mile network 110b. In some embodiments, CPE 150a is a combined router and end node, such as a cable television set-top box.

Communications over last-mile network 110b from CPE 150a, 150b terminate at access module 152a. Although two CPEs 150a, 150b are depicted connected to last-mile network 110b, in other embodiments more or fewer CPEs are connected to last-mile network 110b. In an illustrated embodiment, access module 152a is a DSL Access Module (DSLAM). In other embodiments, access module 152a is a controller for a bank of low-bandwidth modems or a cable or optical access module.

An internet service provider (ISP) typically maintains several access modules 152a, 152b and an access network 110c for connection to the IP network 110d (also called a "core" network) through a Broadband Remote Access Server (BRAS) host 154. In many current embodiments, the access network 110c is migrating to an Ethernet infrastructure that supports the Internet Protocol (IP).

According to an illustrated embodiment of the invention, a customer DHCP session process 141 executes in a DHCP client at end node 120a, and a provider DHCP session process 142 executes in a BRAS on BRAS host 154. In various embodiments, another DHCP session process 143, 144 executes at AAA host 120e or DHCP host 120f, respectively, or some other node on IP network 110d or access network 110c, or some combination. The DHCP session processes 141, 142, 143, 144 determine whether a node (e.g., end node 120a) operating under a particular DHCP lease is still communicating with one or more nodes on sub-networks 110.

2.0 Structural Elements

Figure 2:
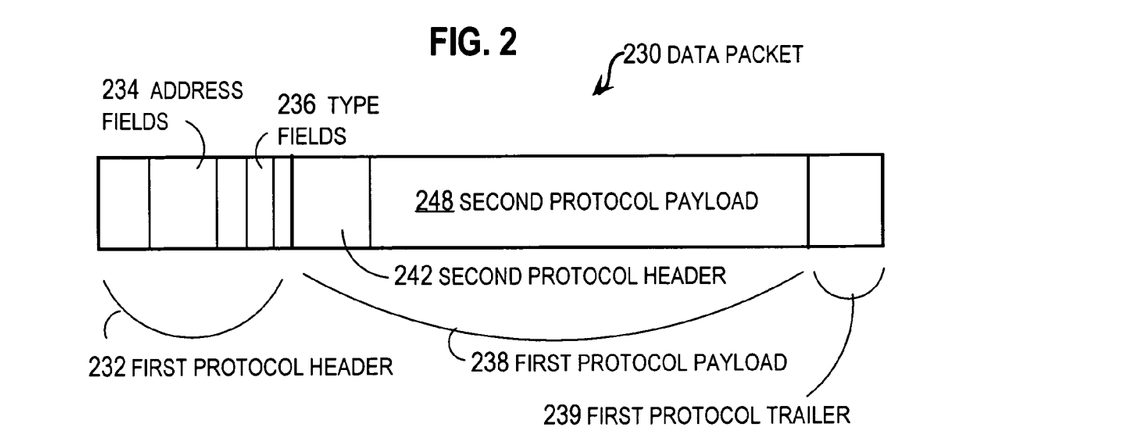
FIG. 2 is a block diagram that illustrates a packet of data communicated over a network.

FIG. 2 is a block diagram that illustrates a generalized data packet 230 communicated over a network, such as network 100. Each packet typically comprises one or more payloads of data, e.g. payloads 238, 248, each encapsulated by at least one network header, e.g., headers 232, 242, respectively. For example, payloads are encapsulated by appending a header before the payload, sometimes called prepending a header, and sometimes by appending a trailer (or tail) after the payload. Each header 232, 242 is formatted in accordance with a network communication protocol; header 232 is formatted according to a first protocol and header 242 is formatted according to a second protocol. The header 242 for the second protocol is included within the payload 238 of the first protocol. As used herein, a header for a particular protocol and its payload constitute a data packet for that protocol and may also be called a cell, frame, datagram or message for that protocol. In some publications data packets for different protocols are distinguished in shorthand by using a different one of the above terms for different protocols, e.g., to refer to Ethernet frames and IP datagrams, but here the terms are used interchangeably.

The header for a protocol typically includes type fields that identify the protocol to which the header belongs and the next protocol in the payload, if any. For example, the header 232 for the first protocol includes type fields 236. The header for a protocol often includes a destination address or a source address, or both, for the information in the payload. For example, the header 232 for the first protocol includes address fields 234 where the source and receiver address for the first protocol is located within the packet 230. As described above, a transmitted data packet's network headers include at least a physical link (layer 1) header and a data-link (layer 2) header.

The physical (layer 1) header defines the electrical, mechanical and procedural mechanisms for proper capture of the Ethernet frame, but is not captured by a Media Access Controller. The layer 1 header may include a DSL or ATM or Ethernet layer 1 header, or some combination.

The data-link header provides information for transmitting the packet over a particular physical link (i.e., a communication medium), such as a point-to-point link, Ethernet layer 2 link, wireless link, optical link, etc. An intermediate network node typically contains multiple physical links with multiple different nodes. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header is a layer 3 header that provides information defining the source and destination address within the interconnected sub-networks (internetwork). Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

DHCP is a control plane protocol that uses messages carried by the User Datagram Protocol (UDP) to transmit IP addresses and other configuration information used to set up IP as the layer 3 protocol, i.e., the internetwork protocol. UDP is a simple, small and fast layer 4 protocol without sophisticated error-tracking and sequencing mechanisms, which utilizes IP broadcasts as a layer 3 protocol to carry UDP messages with DHCP payloads. IP broadcasts do not rely on individual IP addresses for recipients, but direct data packets to all nodes on a particular network segment. An IP broadcast is indicated by a special broadcast value in the IP destination address field of an IP header. A host without an IP address, such as the DHCP client's host at startup, can send an IP data packet by inserting a null address (e.g., 0.0.0.0) in the IP source address field of an IP header, and can receive IP broadcast data packets. DHCP agents are processes on intermediate network nodes that forward DHCP broadcasts received on one segment to a different network segment, as desired.

Figure 3:
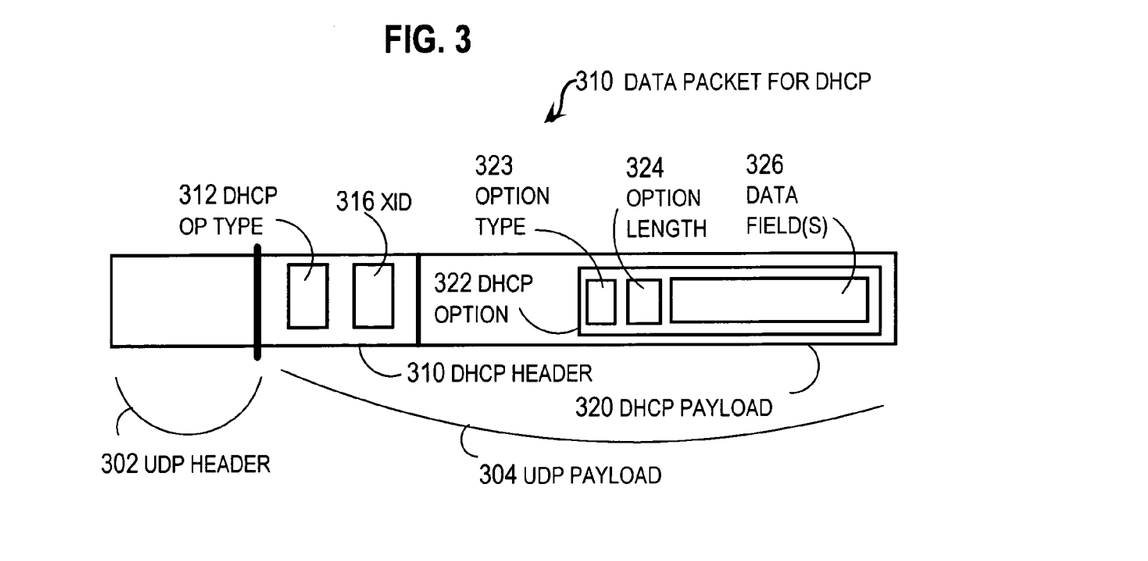
FIG. 3 is a block diagram that illustrates a DHCP packet of data communicated over a network.

FIG. 3 is a block diagram that illustrates a data packet 310 for a DHCP message communicated over a network. A DHCP message is carried inside a UDP payload 304 that follows the UDP header 302. The DHCP message includes a DHCP header 310 and a DHCP payload 320. According to the DHCP standard, described in RFC 2131 and RFC 2132 the entire contents of each of which are herby incorporated by reference as if fully set forth herein, the DHCP header 310 includes an op type field 312 and an xid field 316. The DHCP header 310 also includes other fields that are not relevant to understanding embodiments of the invention. Data held in the DHCP op type field 312 indicates whether the message is sent by a DHCP client to a DHCP server, or is sent by a DHCP server to a DHCP client, as is well known in the art. Data held in the DHCP xid field 312 is usually used by a DHCP client to match incoming DHCP messages with pending DHCP requests for configuration data.

The DHCP payload 320 includes one or more required or optional fields, or both, depending on the message type indicated in a message type field. A DHCP option field 322 is illustrated. The DHCP option field 322 includes an option type field 323 and option length field 324 and one or more data fields 326, depending on the option type expressed in the option type field 323. Data held in the option type field 323 indicates the type of option. Data held in the DHCP option length field 324 indicates the length of the DHCP option. Data held in the DHCP option data fields 326 indicates the values of one or more attributes associated with the option type indicated in the option type field 323. One option carried in the DHCP payload contains an attribute that indicates the type of the DHCP message, such as a DHCPDISCOVER message or a DHCPOFFER message. Different values in the attribute field correspond to different message types. All of the message types are defined in RFC 2131, RFC 2132 and subsequent RFCs, well known in the art. A DHCP payload may carry multiple data options fields like field 322.

Figure 4:
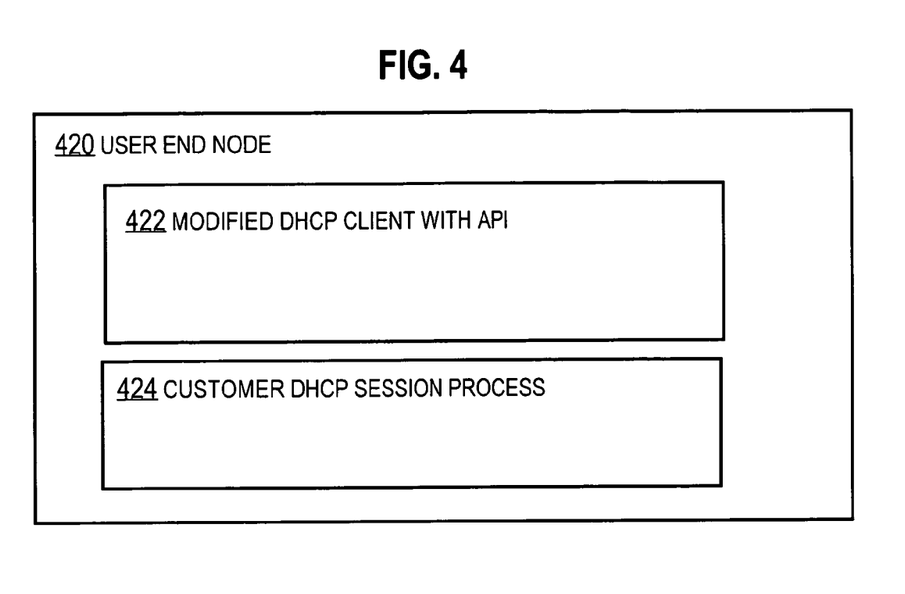
FIG. 4 is a block diagram that illustrates an end user host according an embodiment.

FIG. 4 is a block diagram that illustrates a user end node host 420, according an embodiment. User end node host 420 includes a modified DHCP client 422 and a customer DHCP session process 424, such as process 141 on end node 120a. In the illustrated embodiment, the modified DHCP client 422 has an Application Program Interface (API) through which external processes can exchange information with the modified DHCP client 422. In some embodiments, the customer DHCP session process 424 is incorporated within the modified DHCP client 422.

According to embodiments of the invention, the modified DHCP client 422 is modified from the standard DHCP client in order to engage the customer DHCP session process 424 to accomplish session keep-alive and termination using DHCP messages, as described in more detail below with reference to FIG. 6. Such a modified DHCP client allows PPP session functionality to be omitted.

Figure 5:
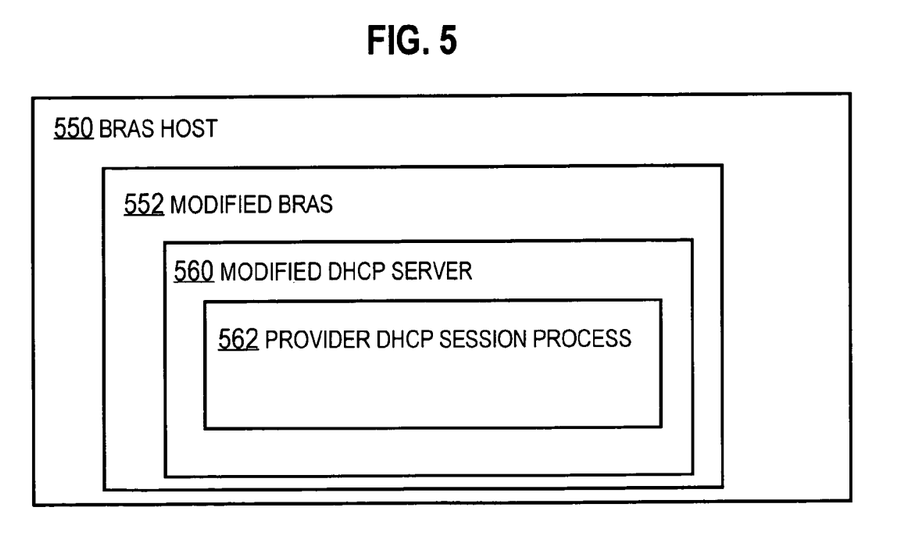
FIG. 5 is a block diagram that illustrates a BRAS host, according an embodiment.

FIG. 5 is a block diagram that illustrates a BRAS host 550, according to an embodiment. The BRAS host 550 includes a modified BRAS 552, a modified DHCP server 560 and a provider DHCP session process 562, such as process 142 on BRAS host 154. The modified DHCP server 560 is modified from a standard DHCP server in order to engage provider DHCP session process 562.

In other embodiments provider DHCP session process 562 is external to modified BRAS 552 and interacts with modified BRAS 552 through an API. In some embodiments, the modified DHCP server 560 is omitted. In some embodiments, a DHCP relay agent is included in the modified BRAS 552. According to some embodiments of the invention, the modified BRAS 552 is modified in order to directly or indirectly engage the provider DHCP session process 562 to accomplish session keep-alive and termination using DHCP messages, as described in more detail below with reference to FIG. 6. In the illustrated embodiment, the modified BRAS 552 engages the provider DHCP session process 562 indirectly though a modified DHCP server 560 that itself is modified to engage the provider DHCP session process 562

In some embodiments, the provider DHCP session process 562 is engaged, directly or indirectly by a DHCP server on a different host from the BRAS host, such as on DHCP host 120*f*, as indicated by process 144. In some embodiments, the provider DHCP session process 562 is engaged, directly or indirectly by a different server on a different host from the BRAS host, such as on AAA host 120*e*, as indicated by process 143.

3.0 Methods for IP Sessions Using DHCP

According to various embodiments of the invention, DHCP standards are adapted to allow DHCP messages to support session keep-alive and termination, such as provided by PPP. Any authentication required for a user to begin communication over the network has occurred before the method described here. In some embodiments, the authentication is performed using PPP. In some embodiments, the authentication is performed using another protocol. In some embodiments, the authentication is performed using DHCP as described in Townsley. In some embodiments, no authentication is performed.

According to an illustrated embodiment of the invention, two new DHCP message types are defined:
1-DHCP-ECHOREQUEST
2-DHCP-ECHOREPLY to support a new session keep-alive and termination functionality within DHCP.

The DHCPAUTH messages follow the format for DHCP messages defined in RFC 2131. These new messages are identified by the presence of a DHCP Message Type option 322, which encodes DHCP message types. For example, one value in DHCP Message Type option field 322 is associated with a DHCP-ECHOREQUEST message type; and a second value in DHCP Message Type option field 322 is associated with a DHCP-ECHOREPLY message type. The DHCP standard should be updated to allow this association. Other fields in the DHCP message header, such as siaddr and fname, are left unused. In various other embodiments, one or more other fields in the DHCP header (such as the xid field 316) or payload are used to indicate these types of messages in addition to or instead of the fields used in the illustrated embodiment.

In the illustrated embodiment, the data in a DHCP-ECHOREQUEST and DHCP-ECHOREPLY message is carried within an option field, for example, as option field 322. As stated above, the option type field 323 indicates whether the message is a request or a reply. The option length field 324 holds data that indicates the length of the data fields 326 as a number of octets (an octet is eight binary digits called bits). For example, the option type field 323 is eight bits, the option length field 324 is eight bits, and the data fields 326 are the next number of octets indicated by the value in the option length field 324. In the illustrated embodiment the data in the option length field 324 indicates a length of one (1) octet.

The data fields 326 are zero or more octets carrying the data specific for the option type. In the illustrated embodiment, the one octet of data fields 326 holds data that indicates whether the message is sent from a DHCP client or a DHCP server. This information is used to prevent loop-back situations, e.g., situations in which the request received was actually issued by the same DHCP process. In an illustrated embodiment a single bit of the octet in data fields 326, called a "C-bit," is used. For example, a value of "1" in the C-bit indicates the message is sent from a modified DHCP client. A value of "0" in the C-bit indicates the message is sent from a modified DHCP server.

In these embodiments, any DHCP-ECHOREQUEST message that is received is answered with a DHCP-ECHOREPLY message. As a result, a first process, such as a modified BRAS, can determine whether a second process engaged in IP unicast communications over the IP network (such as end node 120*a*) is still active by sending a DHCP-ECHOREQUEST and receiving a corresponding DHCP-ECHOREPLY within an appropriate time. If the corresponding reply is not received within an appropriate time, then actions appropriate for loss of communication can be taken, such as terminating billing or attempting to re-establish connection. The corresponding reply can be distinguished based on a value in the xid field, as is done currently for correlating DHCP OFFER response message with a DHCP DISCOVER request message.

3.1 DHCP Session Process

Figure 6:
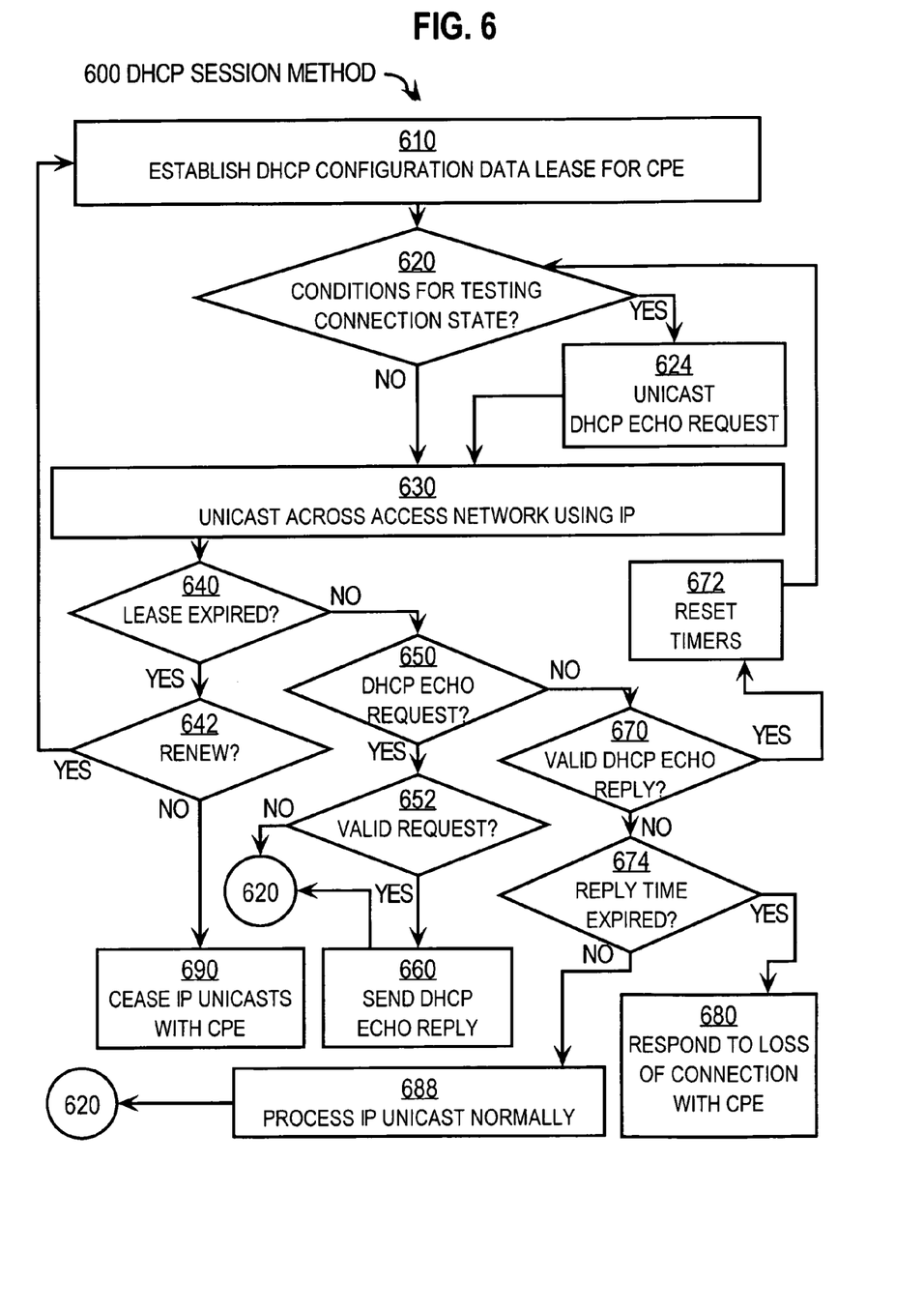
FIG. 6 is a flow diagram that illustrates a method at a DHCP session process, according to an embodiment.

FIG. 6 is a flow diagram that illustrates a method 600 at a DHCP session process, such as process 424 in user end node 420 and process 562 in BRAS host 550, according to an embodiment. Although steps are shown in FIG. 6 in a particular order for purposes of illustration, in other embodiments the steps may be performed in a different order or overlapping in time or one or more steps may be omitted or the steps may be changed in some combination of ways. In some embodiments, the steps depicted in FIG. 6 are included in both customer DHCP session process 424 and provider DHCP session process 562, but the implementations of the steps differ between the two processes.

In step 610, a DHCP lease is established for configuration data for customer premises equipment. For example, after authentication, a lease is offered to modified DHCP client 422 on host 120*a* for an IP address and other configuration data and accepted by the client 422. On modified BRAS host 550, the acceptance from client 422 is received by modified DHCP server.

In step 620, it is determined whether conditions are satisfied for testing a connection state between the modified DHCP client 422 and the modified BRAS 552. For example, in some embodiments, at the client 422 on end node 120*a* it is determined that a request sent over IP network 110*d* to a server on end node 120*c* has not resulted in a response from end node 120*c* after one or more retransmits. In some embodiments it is determined at client 422 that no data packets have been received from BRAS 552 on host 154 for a particular time associated with a keep-alive test interval. In some embodiments it is determined at the BRAS 552 422 on host 154 that no data packets have been received from end node 120*a* for a particular time associated with a keep-alive test interval. In other embodiments one or more other conditions are used to determine that connection test should be tested. If it is determined in step 620 that conditions are not satisfied for testing the connection state, then control passes to step 630.

In step 630, unicast IP communications between customer node and nodes on IP network (e.g., IP network 110*d*) continue across access network (e.g., across access network 110*c*).

If it is determined in step 620 that conditions are satisfied for testing the connection state, then control passes to step 624. In step 624, the DHCP session process on the local node sends a DHCP echo request, such as a DHCP-ECHOREQUEST message. For example, in a modified DHCP server 560, a DHCP-ECHOREQUEST with a "0" in the C-bit is unicast to the customer node. In a modified DHCP client 422, a DHCP-ECHOREQUEST with a "1" in the C-bit is unicast to the provider node. In an illustrated embodiment, a unique value is placed in the xid field 316 of the DHCP header so that an echo reply to this request can be distinguished from other echo reply messages that may be received. In some embodiments a reply timer is started to determine the time spent waiting for a valid echo reply.

In the illustrated embodiment, control passes from step 624 to step 630 to continue IP unicast communications until the request goes unanswered with a predetermined reply time interval. In some embodiments, the DHCP session process goes into a wait mode and does not continue IP unicast communications until the request is answered with a valid DHCP echo reply within the reply time, as described below in steps 670 and 674. In such embodiments, control passes from step 624 to step 670.

In step 640, it is determined whether a DHCP lease for communications between the customer node and nodes on the IP network expires. If so, control passes to step 642. In step 642 it is determined whether the DHCP client on the customer node requests a lease renewal in time. If so, control passes back to step 610 to establish a lease for such communications. For example, as a lease time interval is about to expire, a DHCP client process on customer node (e.g., end node 120a) sends a DHCP renewal message to a DHCP server (e.g., modified DHCP server 560 on BRAS host 550. If in step 642 it is determined that the DHCP client on the customer node does not request a lease renewal in time, then control passes to step 690. In step 690 the lease expires and unicast IP communications between the customer node and nodes on the IP network cease.

If in step 640 it is determined that a DHCP lease for communications between the customer node and nodes on the IP network does not expire, then control passes to step 650. In some embodiments, step 640 is omitted and control passes directly to step 650.

In step 650 it is determined whether a DHCP echo request is received among the unicast IP data packets. If so, control passes to step 652.

In step 652, it is determined whether the echo request is valid. In some embodiments in which step 640 is omitted, step 652 includes determining whether there is DHCP lease in effect for communications between the customer node and nodes on the IP network. In some embodiments, step 652 includes determining whether the request is not a loop-back request. For example, it is determined during step 652 that the DHCP process (e.g., a DHCP client or DHCP serer) that sent the request, as indicated in the illustrated embodiment by the C-bit in data fields 326 of a DHCP-ECHOREQUEST message, is different from the DHCP process receiving the request. If the echo request is not valid, it is ignored; and control passes back to step 620. If the echo request is valid, control passes to step 660 to reply. In some embodiments, step 652 is omitted and control passes directly to step 660.

In step 660 a DHCP echo reply message is returned, i.e., the DHCP session process on the local node sends a DHCP echo reply, such as a DHCP-ECHOREPLY message. For example, in a modified DHCP server 560, a DHCP-ECHOREPLY with a "0" in the C-bit is unicast to the customer node. In a modified DHCP client 422, a DHCP-ECHOREPLY with a "1" in the C-bit is unicast to the provider node. In an illustrated embodiment, the unique value from the xid field 316 of the DHCP-ECHOREQUEST message is placed in the xid field 316 of the DHCP header of the DHCP-ECHOREPLY message so that this reply can be associated with the request. Control then passes back to step 620.

If it is determined in step 650 that a DHCP echo request is not received among the unicast IP data packets, then control passes to step 670. In step 670, it is determined whether a message received is a valid DHCP echo reply. In some embodiments, any DHCP echo reply is considered a valid DHCP echo reply. In an illustrated embodiment, only a DHCP echo reply in response to a DHCP echo request sent by the local node can be a valid reply. If the local node sent no DHCP echo request, e.g., did not execute step 624, then no DHCP echo reply is a valid reply.

If the local node did send an echo request in step 624, then, in some such embodiments, the echo reply must correspond to the request to be valid. In the illustrated embodiments, the correspondence is determined if the values in the xid field of the reply matches a value in an xid field of any request sent during step 624. In some embodiments, a list of outstanding echo request messages sent by the local node and associated xid values are maintained at the local node Therefore a reply to a request sent by another node, e.g., with an xid value not on the list maintained at the local node, is determined during step 670 of such embodiments to be an invalid echo reply.

To prevent a loop-back reply from being mistaken as a valid echo reply, in some embodiments, step 670 includes determining whether the reply was sent from a different DHCP process than at the local node. For example, if the local node is the modified BRAS with a modified DHCP server, then a DHCP-ECHOREPLY message with a C-bit of "0" (indicating the reply was sent by a DHCP server) is determined to be an invalid echo reply. Similarly, if the local node is the modified DHCP client, then a DHCP-ECHOREPLY message with a C-bit of "1" (indicating the reply was sent by a DHCP client) is determined to be an invalid echo reply.

If the valid DHCP echo reply message is not received in step 670, then control passes to step 674. In step 674, it is determined whether the time for a valid reply has expired. For example, it is determined whether the reply timer set during step 624 has exceeded a predetermined maximum reply time interval.

If it is determined in step 674 that the time for a valid reply has not expired, then the unicast communication can be processed normally, and control passes to step 688 to do so. Any processing of IP data packets known in the art may be performed at the local node during step 688. Control then passes back to step 620 to see if new conditions for testing the connection have been satisfied and, if not, continue IP unicasts in step 630.

However, if it is determined in step 674 that the time for a valid reply has expired, then the local node should respond to a loss of the connection between the customer node and the IP network; and control passes to step 680.

In step 680, the local node responds to the loss of connection. Any response may be performed. For example, in some embodiments in which the local node executes a DHCP server, the resources allocated to the customer node are reclaimed earlier than allowed by the DHCP lease. In some embodiments the local node attempts to authenticate the customer node. In some embodiments, a billing agent process is notified that the customer session has ended and to cease charges based on connect-time. In some embodiments in which the local node executes a DHCP client, the client attempts to commence access, such as by sending a new DHCP DISCOVER message, or again logging onto the network in any conventional way. In embodiments that implement one or more methods of Townsley, the DHCP client again responds to a DHCP challenge issued by a challenging process at the BRAS or DHCP server or AAA server. In some embodiments, the customer node releases the local resources allocated to the communication session.

If it is determined in step 670 that a message received is a valid echo reply, then control passes to step 672 to keep the session going. In effect, receipt of the valid echo reply has the effect of receiving a session keep-alive message. Any method may be used in step 672 to keep the session alive. In step 672 for the illustrated embodiment, a keep-alive timer for tracking time since a last keep-alive message is reset; and the timer started in step 624 to mark time elapsed since an echo request was sent is stopped.

Using the method 600, DHCP messages are utilized to determine when to keep-alive an IP session and when to terminate the session. This replaces similar functionality currently provided by PPP. Therefore, in some embodiments, PPP session maintenance functions are not utilized. In some of these embodiments, PPP authentication functions are also not utilized but instead replaced by the DHCP authentication functions of Townsley.

The method 600 does not suffer the disadvantage of a short DHCP lease time used in a prior approach. For example, the short DHCP lease times of a few seconds require the BRAS and DHCP client on the customer node to generate and process large DHCP messages every few seconds for every active IP session.

The method 600 does not suffer the disadvantage of using ARP to detect a loss of connection. Because the method involves direct unicast communication between the DHCP client and the modified BRAS, a mis-configured or rogue node is not likely to be able to respond to the DHCP echo request.

3.2 Enhanced Security

Unlike a basic PPP exchange, DHCP packets including DHCP-ECHOREQUEST and DHCP-ECHOREPLY messages may be freely routed by IP routers across multiple hops.

In some embodiments, an echo request is only considered valid if it traverses only one network segment (i.e., passes through no intervening intermediate network nodes). This prevents malicious IP users on IP network 110*d* from issuing valid echo requests. In some of these embodiments, the single segment requirement is enforced using the IP Time-to-Live (TTL) field, which is set by the originator of a message and decremented by each intermediate network node. The maximum value for this field is 255. Thus an echo request can be assured to be issued on the same segment if the requesting process inserts a value of 255 in the TTL field and the echo request arrives with the value 255 in that field. In such embodiments, step 652 includes determining whether the TTL field of the received challenge is equal to 255.

This method can also be combined with a modification to a DHCP relay agent on access network 110*c* that restricts the relay agent from forwarding DHCP-ECHOREQUEST messages from external DHCP servers, which ensures that any DHCP-ECHOREQUEST messages received by the DHCP client were originated in the BRAS.

In some embodiments, a DHCP authentication challenge is considered valid only if it is the first received after a lease is granted by a DHCP server, as depicted in the illustrated embodiment. In some such embodiments, after a lease is granted, the customer DHCP session process is put in a echo-enabled state. When in the echo-enabled state, the client determines during step 652 that a DHCP echo request message sent to it is valid if it satisfies other criteria for validity described above. The customer DHCP session process is put in an echo-disabled state after a DHCP lease expires and before a DHCP lease is obtained. In such an echo-disabled state, the customer DHCP session process determines during step 652 that any DHCP echo request message sent to it is not valid.

In some embodiments, a DHCP echo-request message is considered valid only if received at a reasonable rate less than some rate limit. In some such embodiments, after an echo request, the customer DHCP session process is put in an echo-disabled state. When in the echo-disabled state, the customer DHCP session process determines during step 652 that any DHCP echo request message sent to it is not valid. The customer DHCP session process is put in an echo-enabled state after a time based on the rate limit. In such an echo-enabled state, the customer DHCP session process determines during step 652 that a DHCP echo request message sent to it is valid if it satisfies other criteria for validity described above.

In some embodiments a hash function is used with a shared secret and a hash value included in the echo request to determine whether the request is valid in step 652. In some embodiments a hash function is used with a shared secret and a hash value included in the echo reply to determine whether the reply is valid in step 670.

4.0 Implementation Mechanisms—Hardware Overview

Figure 7:
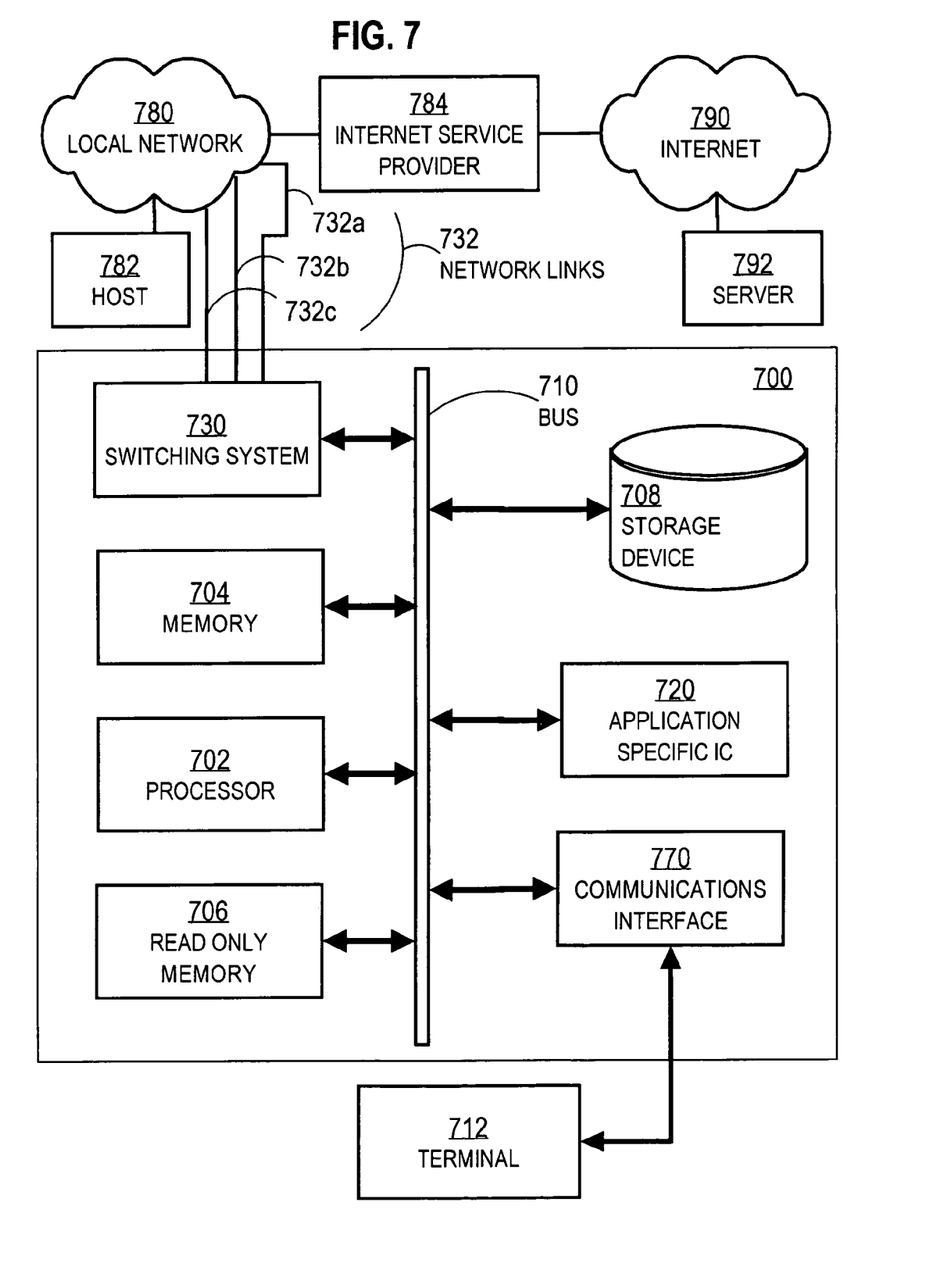
FIG. 7 is a block diagram that illustrates a computer system configured as an intermediate network node upon which an embodiment of the invention may be implemented.

FIG. 7 is a block diagram that illustrates a computer system 700 upon which an embodiment of the invention may be implemented. The preferred embodiment is implemented using one or more computer programs running on a network node such as a router device. Thus, in this embodiment, the computer system 700 is a network node.

Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 710 for use by the processor from an external terminal 712, such as a terminal with a keyboard containing alphanumeric keys operated by a human user, or a sensor. A sensor detects conditions in its vicinity and transforms those detections into signals compatible with the signals used to represent information in computer system 700. Other external components of terminal 712 coupled to bus 710, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 712. In some embodiments, terminal 712 is omitted.

Computer system 700 also includes one or more instances of a communications interface 770 coupled to bus 710. Communication interface 770 provides a two-way communication coupling to a variety of external devices that operate with their own processors, such as printers, scanners, external disks, and terminal 712. Firmware or software running in the computer system 700 provides a terminal interface or character-based command interface so that external commands can be given to the computer system. For example, communication interface 770 may be a parallel port or a serial port such as an RS-232 or RS-422 interface, or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 700 includes switching system 730 as special purpose hardware for switching information for flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments an input interface or an output interface or both are linked to each of one or more external network elements. Although three network links 732a, 732b, 732c are included in network links 732 in the illustrated embodiment, in other embodiments, more or fewer links are connected to switching system 730. Network links 732 typically provides information communication through one or more networks to other devices that use or process the information. For example, network link 732b may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732a, as output on the same or different network link, e.g., 732c. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732a and send it to the correct destination using output interface on link 732c. The destinations may include host 782, server 792, other terminal devices connected to local network 780 or Internet 790, or other routing and switching devices in local network 780 or Internet 790.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720 and circuits in switching system 730, may be used in place of or in combination with software to implement the invention. Thus, embodiments of the invention are not limited to any specific combination of hardware and software.

The signals transmitted over network link 732 and other networks through communications interfaces such as interface 770, which carry information to and from computer system 700, are exemplary forms of carrier waves. Computer system 700 can send and receive information, including program code, through the networks 780, 790 among others, through network links 732 and communications interfaces such as interface 770. In an example using the Internet 790, a server 792 transmits program code for a particular application, requested by a message sent from computer 700, through Internet 790, ISP equipment 784, local network 780 and network link 732b through communications interface in switching system 730. The received code may be executed by processor 702 or switching system 730 as it is received, or may be stored in storage device 708 or other non-volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 732b. An infrared detector serving as communications interface in switching system 730 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702 or switching system 730.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for supporting subscriber sessions for access to a service provider network:

receiving from a first node of a provider network node and a customer network node, at a different second node of the provider network node and the customer network node, a Dynamic Host Configuration Protocol (DHCP) formatted echo-request message that includes a DHCP option field that holds data that indicates an echo-request type; and in response to receiving the echo-request message, sending to the first node a DHCP formatted echo-reply message that corresponds to the echo-request message, wherein the echo-reply message includes a DHCP option field that holds data that indicates an echo-reply type, which when received by the first node causes the first node to determine a connected state with the second node, wherein the echo-request type and echo-reply type support session keep-alive or session termination only.

2. A method as recited in claim 1, wherein the provider network node is on premises of a service provider for an Internet Protocol (IP) network and a customer network node is on premises of a customer different from the premises of the provider.

3. A method as recited in claim 1, wherein said provider network node executes a gateway server for remote access to the IP network.

4. A method as recited in claim 1, wherein said customer network node executes a client for remote access to the IP network.

5. A method as recited in claim 1, said step of sending the echo-reply message further comprising placing data from a DHCP header xid field of the echo-request message into a DHCP header xid field of the echo-reply message, whereby the echo-reply message corresponds to the echo-request message.

6. A method as recited in claim 1, wherein:

the method further comprises determining whether the echo-request message is valid; and said step of sending the echo-reply message is performed only if it is determined that the echo-request message is valid.

7. A method as recited in claim 6, said step of determining whether the echo-request message is valid further comprises determining whether a DHCP lease is in effect for configuration data for unicast communications between the provider network node and the customer network node.

8. A method as recited in claim 6, wherein:

the method is performed by a local DHCP process of a DHCP server process and a DHCP client process;

said step of receiving the echo-request message further comprises receiving the echo-request message that includes the DHCP option field that holds sender data that indicates a sending DHCP process of a DHCP server process and a DHCP client process, which sending DHCP process originated the echo-request message; and said step determining whether the echo-request message is valid further comprises determining whether the echo-request is not a loop back request by determining whether the sending DHCP process is different from the local DHCP process.

9. A method as recited in claim 8, said step of sending the echo-reply message further comprising sending the echo-reply message that includes the DHCP option field that holds sender data that indicates whether the local DHCP process is a DHCP server or a DHCP client.

10. A method as recited in claim 1, wherein a Point to Point Protocol (PPP) is not used to determine connection state between the first node and the second node.

11. A method for supporting subscriber sessions for access to a service provider network:

determining whether conditions are satisfied for testing connection state between a provider network node on an Internet Protocol (IP) network and a customer network node;

if conditions are satisfied for testing connection state, then sending, from a first node of the provider network node and the customer network node to a different second node of the provider network node and the customer network node, a Dynamic Host Configuration Protocol (DHCP) formatted echo-request message that includes an option field that holds data that indicates an echo-request type, which when received by the second node causes the second node to return a DHCP formatted echo-reply message that includes an option field that holds data that indicates an echo-reply type;

determining whether an echo-reply message that corresponds to the echo-request message is received within a particular reply time interval after sending the echo-request message; and if it is determined that the echo-reply message that corresponds to the echo-request message is not received within the particular reply time interval, then responding to a loss of connection state between the provider network node and the customer network node, wherein the echo-request type and echo-reply type support session keep-alive or session termination only.

12. A method as recited in claim 11, wherein the provider network node is on premises of a service provider for the Internet Protocol (IP) network and a customer network node is on premises of a customer different from the premises of the provider.

13. A method as recited in claim 11, wherein said provider network node executes a gateway server for remote access to the IP network.

14. A method as recited in claim 11, wherein said customer network node executes a client for remote access to the IP network.

15. A method as recited in claim 11, said step of determining whether the echo-reply message corresponds to the echo-request message further comprising determining whether first data in a DHCP header xid field of the echo-reply message matches second data in a DHCP header xid field of the echo-request message.

16. A method as recited in claim 11, said step of sending the echo-request message further comprising sending an echo-request message that includes in the option field sender type data that indicates whether the method is performed by a DHCP client or a DHCP server.

17. A method as recited in claim 16, said step of determining whether the echo-reply message corresponds to the echo-request message further comprising determining whether the sender type data in the echo-reply message is different from the sender type data in the echo request message.

18. A method as recited in claim 11, said step of determining whether conditions are satisfied for testing connection state further comprising determining whether no data packets are received at a remote access server on the provider network node from the customer network node within a particular keep-alive time interval.

19. A method as recited in claim 11, said step of determining whether conditions are satisfied for testing connection state further comprising determining whether a DHCP lease is in effect for configuration data for unicast communications with the customer network node.

20. A method as recited in claim 11, said step of determining whether conditions are satisfied for testing connection state further comprising determining whether no data packets are received at a customer network node from a remote access server on the provider network node within a particular keep-alive time interval.

21. A method as recited in claim 11, said step of responding to a loss of connection state further comprising attempting to re-establish a connection state between the provider network node and the customer network node.

22. A method as recited in claim 11, said step of responding to a loss of connection state further comprising notifying a billing agent process of termination of a session between the customer network node and the provider network node.

23. A method as recited in claim 11, wherein a Point to Point Protocol (PPP) is not used for testing connection state between the provider network node and the customer network node.

24. An apparatus for supporting subscriber sessions with a service provider network, comprising:

means for receiving from a first node of a provider network node and a customer network node, at a different second node of the provider network node and the customer network node, a Dynamic Host Configuration Protocol (DHCP) formatted echo-request message that includes a DHCP option field that holds data that indicates an echo-request type; and means for sending to the first node a DHCP formatted echo-reply message that corresponds to the echo-request message in response to receiving the echo-request message, wherein the echo-reply message includes a DHCP option field that holds data that indicates an echo-reply type, which when received by the first node causes the first node to determine a connected state with the second node, wherein the echo-request type and echo-reply type support session keep-alive or session termination only.

25. An apparatus for supporting subscriber sessions with a service provider network, comprising:

means for determining whether conditions are satisfied for testing connection state between a provider network node on an Internet Protocol (IP) network and a customer network node;

means for sending from a first node of the provider network node and the customer network node to a different second node of the provider network node and the customer network node, a Dynamic Host Configuration Protocol (DHCP) formatted echo-request message that includes an option field that holds data that indicates an echo-request type, if conditions are satisfied for testing connection state, wherein when the echo-request message is received by the second node the echo-request message causes the second node to return a DHCP formatted echo-reply message that includes an option field that holds data that indicates an echo-reply type;

means for determining whether an echo-reply message that corresponds to the echo-request message is received within a particular reply time interval after sending the echo-request message; and means for responding to a loss of connection state between the provider network node and the customer network node, if it is determined that the echo-reply message that corresponds to the echo-request message is not received within the particular reply time interval, wherein the echo-request type and echo-reply type support session keep-alive or session termination only.

26. An apparatus for supporting subscriber sessions with a service provider network, comprising:

a network interface that is coupled to a network for communicating one or more packet flows therewith;

one or more processors;
a computer readable medium; and
one or more sequences of instructions stored on the computer readable medium, which, when executed by the one or more processors, causes the one or more processors to carry out the steps of:
receiving from a network node a Dynamic Host Configuration Protocol (DHCP) formatted echo-request message that includes a DHCP option field that holds data that indicates an echo-request type; and
in response to receiving the echo-request message, sending to the network node a DHCP formatted echo-reply message that corresponds to the echo-request message, wherein the echo-reply message includes a DHCP option field that holds data that indicates an echo-reply type, which when received by the network node causes the first node to determine a connected state with the second node,
wherein the echo-request type and echo-reply support session keep-alive or session termination only.

27. An apparatus as recited in claim 26, wherein the apparatus is one of a provider network node on premises of a service provider for an Internet Protocol (IP) network and a customer network node on premises of a customer different from the premises of the provider; and the network node is a different one of the provider network node and the customer network node.

28. An apparatus as recited in claim 27, wherein said provider network node executes a gateway server for remote access to the IP network.

29. An apparatus as recited in claim 27, wherein said customer network node executes a client for remote access to the IP network.

30. An apparatus as recited in claim 26, said step of sending the echo-reply message further comprising placing data from a DHCP header xid field of the echo-request message into a DHCP header xid field of the echo-reply message, whereby the echo-reply message corresponds to the echo-request message.

31. An apparatus as recited in claim 26, wherein:
execution of the one or more sequences of instructions further causes the one or more processors to carry out the step of determining whether the echo-request message is valid; and
said step of sending the echo-reply message is performed only if it is determined that the echo-request message is valid.

32. An apparatus as recited in claim 31, said step of determining whether the echo-request message is valid further comprises determining whether a DHCP lease is in effect for configuration data for unicast communications between the apparatus and the network node.

33. An apparatus as recited in claim 31, wherein:
execution of the one or more sequences of instructions further causes the one or more processors to carry out the steps of a local DHCP process of a DHCP server process and a DHCP client process;
said step of receiving the echo-request message further comprises receiving the echo-request message that includes the DHCP option field that holds sender data that indicates a sending DHCP process of a DHCP server process and a DHCP client process, which sending DHCP process originated the echo-request message; and
said step determining whether the echo-request message is valid further comprises determining whether the echo-request is not a loop back request by determining whether the sending DHCP process is different from the local DHCP process.

34. An apparatus as recited in claim 33, said step of sending the echo-reply message further comprising sending the echo-reply message that includes the DHCP option field that holds sender data that indicates the local DHCP process.

35. An apparatus as recited in claim 26, wherein a Point to Point Protocol (PPP) is not used to determine connection state between the first node and the second node.

36. An apparatus for supporting subscriber sessions with a service provider network, comprising:
a network interface that is coupled to a network for communicating one or more packet flows therewith;
one or more processors;
a computer readable medium; and
one or more sequences of instructions stored on the computer readable medium, which, when executed by the one or more processors, causes the one or more processors to carry out the steps of:
determining whether conditions are satisfied for testing connection state between the apparatus and a different network node;
if conditions are satisfied for testing connection state, then sending to the different network node, a Dynamic Host Configuration Protocol (DHCP) formatted echo-request message that includes an option field that holds data that indicates an echo-request type, which when received by the network node causes the network node to return a DHCP formatted echo-reply message that includes an option field that holds data that indicates an echo-reply type;
determining whether an echo-reply message that corresponds to the echo-request message is received within a particular reply time interval after sending the echo-request message; and
if it is determined that the echo-reply message that corresponds to the echo-request message is not received within the particular reply time interval, then responding to a loss of connection state between the apparatus and the different network node,
wherein the echo-request type and echo-reply type support session keep-alive or session termination only.

37. An apparatus as recited in claim 36, wherein the apparatus is one of a provider network node on premises of a service provider for an Internet Protocol (IP) network and a customer network node on premises of a customer different from the premises of the provider; and the network node is a different one of the provider network node and the customer network node.

38. An apparatus as recited in claim 37, wherein said provider network node executes a gateway server for remote access to the IP network.

39. An apparatus as recited in claim 37, wherein said customer network node executes a client for remote access to the IP network.

40. An apparatus as recited in claim 36, said step of determining whether the echo-reply message corresponds to the echo-request message further comprising determining whether first data in a DHCP header xid field of the echo-reply message matches second data in a DHCP header xid field of the echo-request message.

41. An apparatus as recited in claim 36, said step of sending the echo-request message further comprising sending an echo-request message that includes in the option field sender type data that indicates whether execution of the one or more sequences of instructions further causes the one or more processors to carry out the step of a DHCP client or a DHCP server.

42. An apparatus as recited in claim 41, said step of determining whether the echo-reply message corresponds to the echo-request message further comprising determining whether the sender type data in the echo-reply message is different from the sender type data in the echo request message.

43. An apparatus as recited in claim 36, said step of determining whether conditions are satisfied for testing connection state further comprising determining whether no data packets are received from the different network node within a particular keep-alive time interval.

44. An apparatus as recited in claim 36, said step of determining whether conditions are satisfied for testing connection state further comprising determining whether a DHCP lease is in effect for configuration data for unicast communications with the different network node.

45. An apparatus as recited in claim 37, said step of responding to a loss of connection state further comprising attempting to re-establish a connection state between the apparatus and the different network node.

46. An apparatus as recited in claim 36, said step of responding to a loss of connection state further comprising notifying a billing agent process of termination of a session between the apparatus and the different network node.

47. An apparatus as recited in claim 36, wherein a Point to Point Protocol (PPP) is not used for testing connection state between the apparatus and the different network node.

* * * * *